INVENTORS.
SIEGFRIED H. DECHER
DALE H. RAUCH
BY
ATTORNEYS.

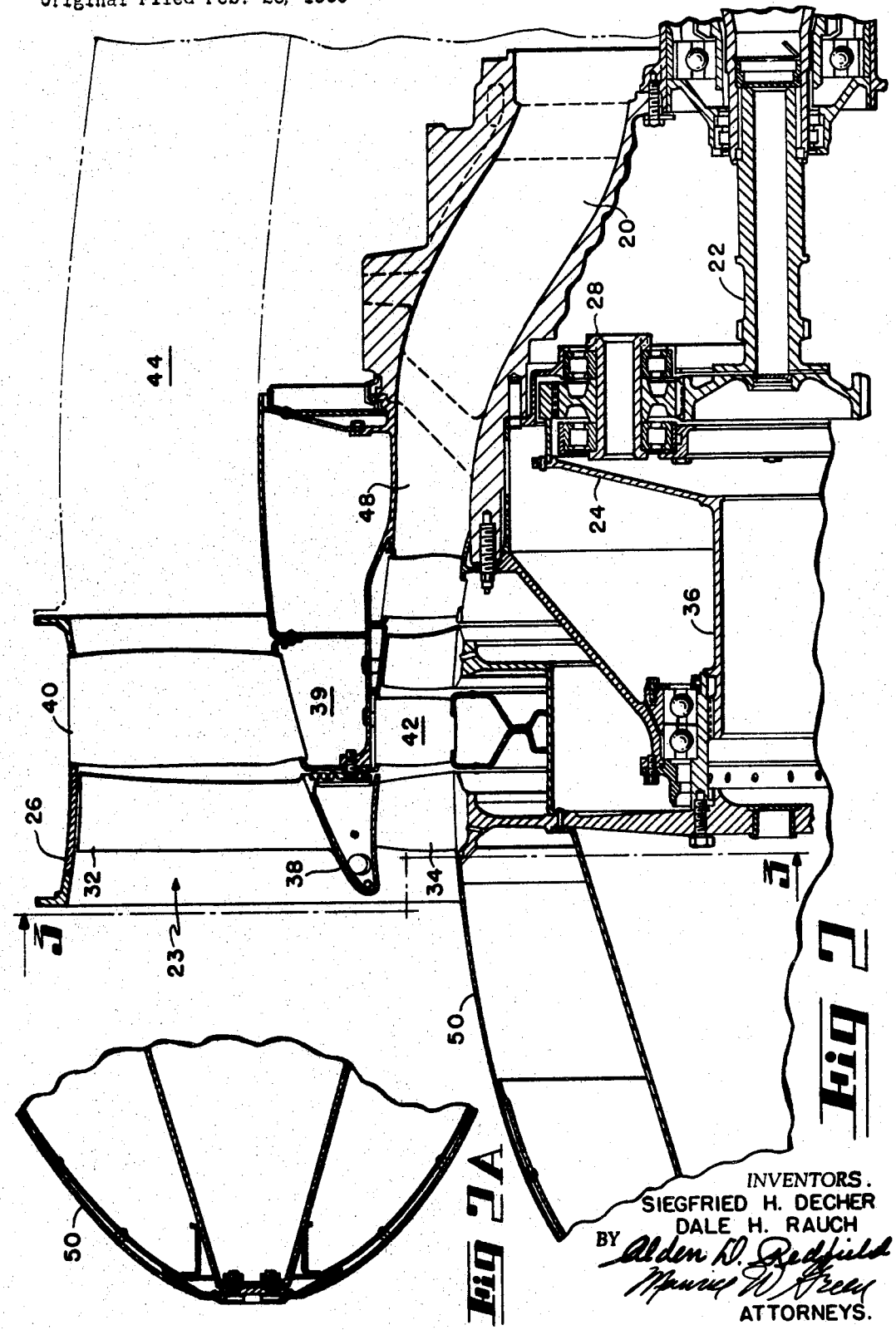

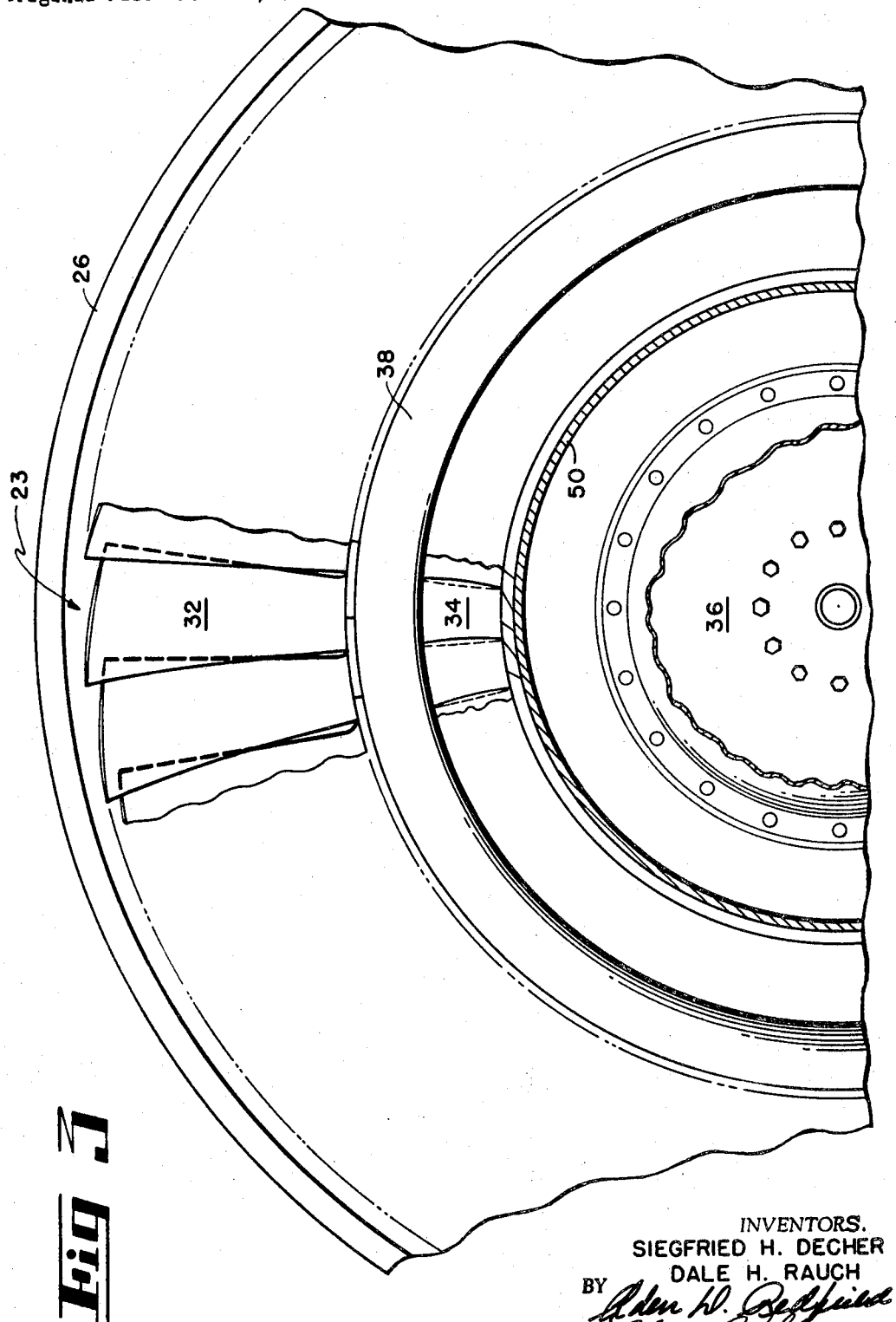

3,390,527
HIGH BYPASS RATIO TURBOFAN
Siegfried H. Decher, Trumbull, and Dale H. Rauch, West Haven, Conn., assignors to Avco Corporation, Stratford, Conn., a corporation of Delaware
Continuation of application Ser. No. 435,515, Feb. 26, 1965. This application July 19, 1967, Ser. No. 657,463
2 Claims. (Cl. 60—226)

ABSTRACT OF THE DISCLOSURE

A high bypass ratio turbofan having a forward fan assembly divided into inner precompression and outer bypass annular regions, both regions located radially outboard of the compressor blading, each uniquely designed for a pressure rise required by aerodynamic conditions, with wall structure extending radially inward and rearward of the inner precompressing portion forming a stationary annular confining passage from the inner precompression portion rearward and radially inward into the compressor.

---

This application is a continuation of our application Ser. No. 435,515, filed Feb. 26, 1965.

This invention relates to a bypass engine and fan assemly, sometimes also referred to as a turbofan.

It is a principal object to provide a combination of structure which will satisfactorily solve certain aerodynamic and stress problems presented in the use of a relatively high bypass ratio fan in the lower subsonic flight range and by such structure to obtain performance gains appreciably higher than in the more commonly used fanjet engines.

Another important feature and object is the use in combination with other elements of a front fan with inner and outer annular portions with a rotating integral dividing wall therebetween positioned to serve as the initial air inlet forward of the engine with the inner fan portion effecting precompression and divided from the outer bypass region at the wall division in the fan and feeding air through a rearwardly and inwardly extending annular channel to the engine compressor with said inner supercharging or so-called precompressing portion of the fan located outboard and substantially forward of the initial stages of the engine compressor blading.

It is a further feature and object to provide in combination with the aforesaid arrangement a reduction gearing between the power turbine wheel and the fan, such that the relatively higher speed of rotation of the power turbine may be obtained, with optimum selection and freedom of design of the fan speed and the turbine speed and number of turbine wheels which may be accomplished by variation in gear ratio.

On consideration of the requirements necessary for the high bypass ratio fan, as compared to the prior art engines using lower bypass ratio where a fan blade, without dividing wall, was designed to deliver both the bypass air and the air to the engine compressor, it has been found that with the larger air flow and lower r.p.m. of the high bypass ratio fan that a fan designed to accomplish the dual purposes in this range is difficult of accomplishment. Particularly, it is not practical to use the basic design principles of today's low bypass engines by adapting, for example, the fan blade to the larger airflow and smaller fan pressure ratio required. One important reason concerns the fan itself. The much larger airflow demands basically lower rotational speeds in the fan section as compared to the engine compressor. For high bypass ratios, it becomes therefore impractical to use the design principle of certain front fan engines where the fan stages are an integral part of the compressor.

In any case, a long fan blade of a high bypass fan presents a special aerodynamic problem, if one wants to avoid too low root speeds (causing excessively high pressure coefficients and higher camber at the root section) or too high tip speeds which will result in high relative Mach number and loss in efficiency near the tip.

Another reason that low bypass fan principles are not applicable involves the fan driving turbine. It is evident that the work output required from the fan driving turbine increases with bypass ratio. Present day aft fan engines, with the turbine section located inside the fan section, are limited with regard to an incerase of work output per stage with increasing bypass ratio. The relatively low rotational speed imposed by the high bypass fan would call for a relatively large number of turbine stages in case of the high bypass fan engine if gear reduction is not to be used.

It is an important concept of this invention that the aerodynamic fan problems, mentioned above, can be solved by moving the fan blade root section outboard as well as forward of the main compressor. In the case of the front fan, here disclosed, this requires an annular ducting which feeds the engine airflow from the hub portion of the fan blade inward and rearward toward the front flange of the engine compressor, with sufficient length of passage being afforded to allow for a free stream diffusion to take place from the fan blading to the inlet of the compressor. From a mechanical standpoint, moving the fan outboard of the engine compressor makes it possible to bring the blade root stresses within acceptable limits. It is a preferred form of this invention to use relatively high-speed power turbine components with one or two stages driving the relatively slow-running fan through a reduction gear for large bypass ratios (above 4), and with this arrangement the gear ratio is in the order of 2.5.

An important distinction over prior art devices results from the combination of structure afforded by this invention in that certain desirable advantageous results are obtained without the use of guide vanes ahead of the fan, with their evident disadvantages including difficulty of assembly as well as the possibility of icing. This comes about wherein certain prior art devices use such inlet guide vanes to assist in overcoming the difficulties encountered when the supercharging portion of the fan is left at substantially the same radius as the initial stages of the engine compressor blading. Under such conditions the use of inlet guide vanes ahead of the fan will give the necessary leverage to run the root speed of the fan at the proper value to solve problems of high diffusion and to reduce the Mach number at the blade tips by designing such inlet vanes for pre-whirl in the bypass region. It is therefore an important advantage to the herein disclosed structure that both of these problems are brought within acceptable limits by establishing the supercharging region at an annular region outboard of the compressor whereby relative speeds are such that a satisfactory compromise is possible in both inner and outer regions for both stress and aerodynamic considerations and without the objectionable inlet guide vanes.

The above and other objects of the invention will appear more fully from the following more detailed description of an illustrative structure and by reference to the accompanying drawings forming a part hereof and wherein:

FIGURE 2 is a cross section through an engine and fan assembly showing the upper half of the fan and engine, including gearing and location of the several elements of the combination of structure;

FIGURE 2A is a cross section of the front fairing corresponding to and completing the showing in FIGURE 2;

FIGURE 3 is a view of the front of the fan assembly partly broken away and partly in section and taken on the line 3—3 of FIGURE 2.

Figure 1:
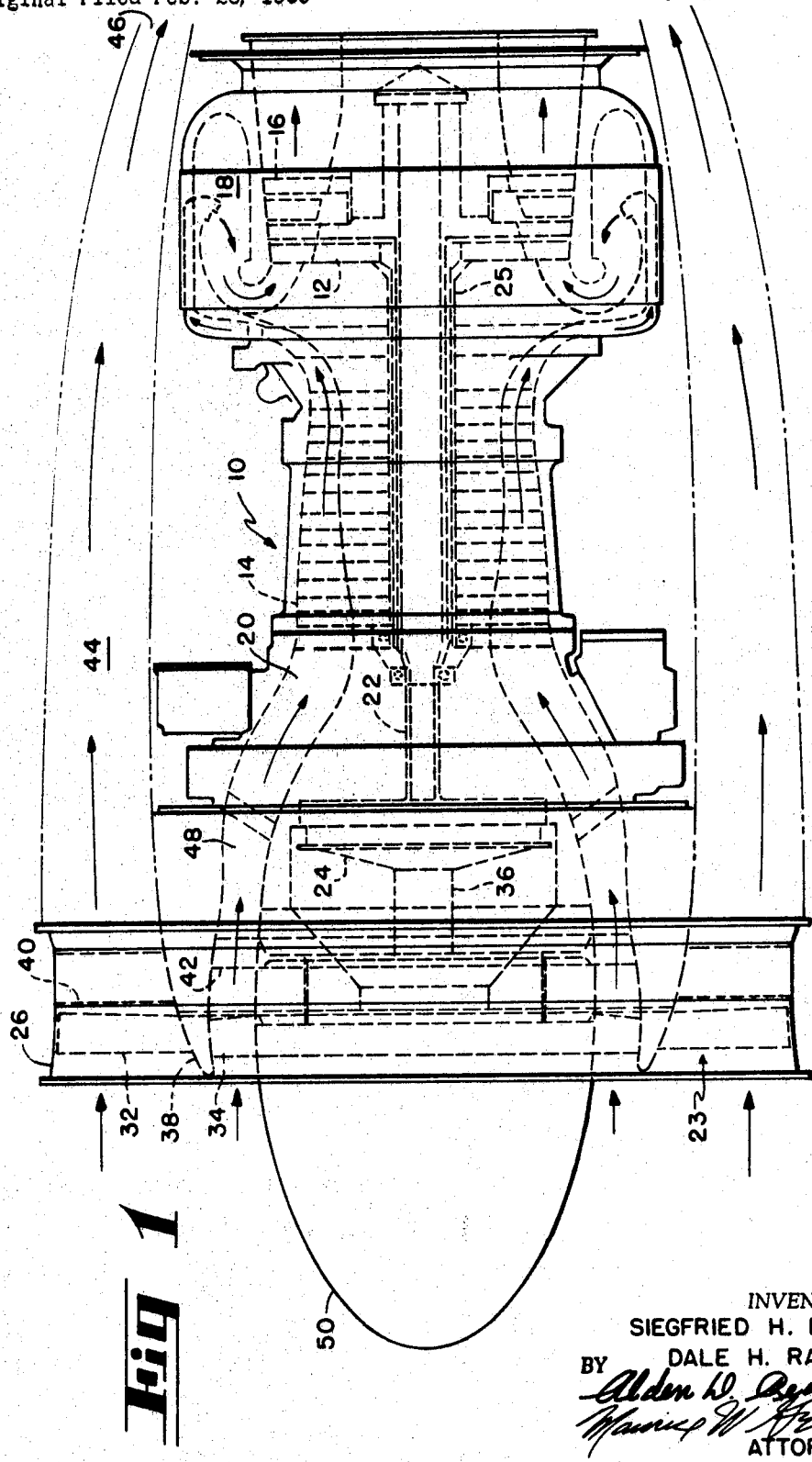
FIGURE 1 is a schematic cross section showing a gas turbine engine with front bypass fan rotated by the power turbine and showing location and arrangement of the bypass and compressor supercharging regions of the front fan and dividing wall therebetween.

Referring to the drawings and particularly to the schematic showing of FIGURE 1 and to the cross section in FIGURE 2, a gas turbine engine 10 of the general type shown in U.S. Patent 3,088,278 is provided with a gas producer turbine 12, driving a compressor 14 (so-called gas producer compressor), power turbine 16, combustion chamber 18, and air inlet 20. The power turbine 16 rotates a separate power shaft 22 forwardly extending, and such power shaft 22 is co-axial with and rotates independent of, but inside, the gas producer turbine shaft 25. Air enters the inlet 20 and is compressed by the compressor 14 and flows to the combustor 18. The mixing and combustion of fuel takes place in the combustor 18 and the hot gas flows into the turbine wheels 12 and 16. This engine has added thereto a front fan assembly 23 and gear reduction 24, the structure of which, in combination with certain elements of the engine 10, constitutes the invention here disclosed. The fan assembly 23 and gear reduction 24 are made up of an annular fan housing 26 within which is supported a gear train 28 actuated by the shaft 22. This shaft 22, which is the power shaft from the power turbine 16, rotates the fan assembly 23 through the gear reduction 24. The fan assembly has an outer bypass fan portion 32 and an inner supercharging fan portion 34. The fan assembly is made up of a plurality of radially extending fan blades supported from the center shaft 36 and forming two annular regions, one the outer fan bypass region 32 and the inner fan supercharging portion 34 divided by a forwardly projecting wall 38 annularly extending and supported on the fan assembly 23. The outer housing 26 supports stator blades 40 rearward of the fan in the outer bypass channel and stator blades 42 in the inner supercharging fan, also rearward of the fan. The outer bypass channel 44 extends rearwardly from the outer bypass portion of the housing 26 into the fan exhaust nozzle 46. The entire exhaust nozzle and the forward housing rearward of the outer bypass portion 32 of the fan 23 is an annular air passage. The air channel 48, rearward of the precompressor fan portion 34, extends in an annular form rearward and inward to the inlet 20 of the air compressor 14.

The fan assembly 23 carries a forwardly extending fairing 50 having a diameter such as to define the inner limit of the supercharging portion 34 of the fan assembly, the dividing wall 38 forming the outer dividing portion and outer limit of the inner supercharging fan portion 34 which on rotation of the fan assembly feeds air into the channel 48 and into the inlet 20 of the main compressor 14.

The provision of the forwardly extending dividing wall 38 between the inner supercharging portion 34 and the outer bypass portion 32 of the fan assembly 23 affords a positive mechanical wall between the supercharging and bypass fan regions. In certain prior art devices the division in flow between the bypass channel and the inlet to the compressor is accomplished behind the fan with no forwardly extending wall, whereas in this disclosure the division begins forward of the fan integral with and rotating with the fan. The flow division continues in a nonrotating structure 39 behind the fan. (See FIGURE 2.)

It is noted that the annular air channel passage 48 feeds the incoming air flow, from the supercharging portion 34 of the fan, and extends rearward and inward toward the main compressor 14. Therefore, with the use of a gear reduction between the turbine shaft 22 and the fan 23 the relative location of the supercharging portion 34 of the fan substantially outboard of the main compressor 14, together with the fairing 50 and the forwardly extending wall 38 defining the limits of the supercharging portion of the fan, makes it possible to make use of a blade form to couple the relatively slow rotating fan to efficiently deliver the air to the inlet to the main compressor 14. It is remembered that the relatively slow rotation of the fan 23 is made necessary by the high bypass ratio desired for this installation. Therefore, the fact of positive separation ahead of and integral with the fan between the outer fan bypass portion and the inner supercharging portion effected by the annular wall 38 is important.

The wall 38 provides a positive mechanical separation, maintaining the possibility of a positive and efficient change in static pressure gradient from the tip section of the supercharging portion to the root section of the bypass portion of each blade. The provision of a separating wall 38 allows freedom to design the fan portion 32 of the blade and the supercharging portion 34 for different pressure rises without any aerodynamic compromise.

The provision of the supercharging or precompressing inner portion of the fan at a substantial radius from the center of the fan, in addition to advantages for aerodynamic and stress considerations previously mentioned, also provides necessary space for the housing of the gear reduction in the central portion of the fan housing assembly, and therefore such arrangement affords a satisfactory combination for producing the result desired, particularly advantageous for a fan component of high bypass ratio.

The fan assembly 23 is located forward of the engine including the outer bypass region 32 of the fan and the inner supercharging portion 34. Thus the fan with its flow guiding elements, such as the fairing 50 and the forwardly extending wall 38, are all rotating parts and are positioned to serve as the initial air inlet forward of the engine. The avoidance of the use of stationary guide vanes ahead of the fan makes possible a design of fan blade which will give the desired bypass ratio with speeds of rotation such that the stresses in the rotating blade are kept within reasonable limits. The reduced speed of rotation is afforded by the gear reduction while still maintaining the high rotative speed of the driving turbine, provided the inner supercharging portion of the fan is located at a substantial radius from the center of rotation of the fan, i.e., outboard of the compressor diameter. All of these features provide a combination of structure working together to solve the problems of stress and aerodynamics in a high bypass fan.

It is worthy of note that the dividing wall 38 between inner supercharging and outer bypass portions rotates with the blades and divides the supercharging portion 34 from the bypass portion 32 beginning in front of the blade, as distinguished from a division only rearward of the blade as in certain prior art devices. The separating wall 38 allows the fan portion 32 and the supercharging portion 34 of the fan blade to be designed for different pressure rise conditions as they are in general required for optimum thermodynamic cycle conditions. Therefore, the use of a dividing wall beginning forward of the fan is an important factor in adapting the high bypass fan engine to the lower rotational speeds required aerodynamically for the fan to produce an optimum power plant for subsonic aircraft.

The provision of a gear reduction, such as 28, between the fan and the driving turbine 16 is a necessary requirement if the relatively high rotational speeds of the turbine are to be maintained. The design proposed where the fan and supercharging blade is moved radially outboard of the main compressor provides the space required for the reduction gearing.

The use of such a gear reduction between the fan driving turbine and the fan assembly, which includes both the bypass fan and the supercharging or precompressing portion, makes possible a complete flexibility in design between the relative r.p.m. of the fan assembly and the turbine, as well as the relative number of stages of these two elements.

Although the invention has been described by reference to a specific structure found practical in actual operation, it is intended that modifications may be made within the scope of the following claims.

We claim:
1. In a bypass fan and gas turbine engine combination of the type wherein means are provided to cause said fan assembly to operate both to bypass air and to precompress to a gas producer main compressor of said engine over the entire range of inflight airspeeds including relatively high forward speeds, said means comprising:
   an annular outer bypass fan portion of said fan assembly;
   annular walls forming a bypass fan exhaust nozzle rearward of said outer bypass fan portion of said fan assembly;
   an inner annular precompressing portion of said fan assembly to feed precompressed air into said compressor;
   an annular forwardly extending wall secured to and rotatable with said fan and formed to divide said outer bypass fan portion from said inner annular precompressing fan portion and affording positive separation between said outer bypass fan portion and inner precompressing fan portion each designed for a different pressure rise required by aerodynamic conditions;
   wall structure forming a stationary annular passage extending rearward and radially inward from said inner precompression portion of said fan assembly into said compressor, with said passage formed to positively confine and to direct flow therethrough;
   said annular precompressing portion positioned radially outward from the extended common axis of rotation of said fan and compressor a radial distance beginning in a region outboard of the blading diameter of said compressor, but only so far outboard as will maintain aerodynamic loading on said fan within acceptable limits when operating in relatively high or relatively low airspeed ranges in both inner and outer portions;
   the spacing of said fan forward of said compressor being in amount such that there is afforded a length and configuration of said passage resulting in passage surface velocities which will allow flow into said compressor without separation.
2. Structure as in claim 1 in which:
   said inner and outer fan portions serve as the initial air inlet forward of said engine whereby said fan assembly is operable without the use of inlet guide vanes.

References Cited
UNITED STATES PATENTS 2,952,973  9/1960  Hall _____ 60—224

FOREIGN PATENTS 905,229  4/1945  France.
943,626  12/1963  Great Britain.

MARTIN P. SCHWADRON, *Primary Examiner.*

DOUGLAS HART, *Assistant Examiner.*